Figure 1:
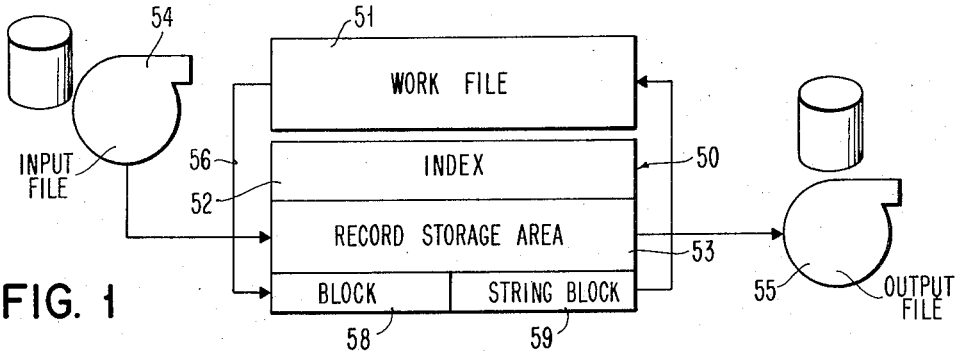
Figure 2A:
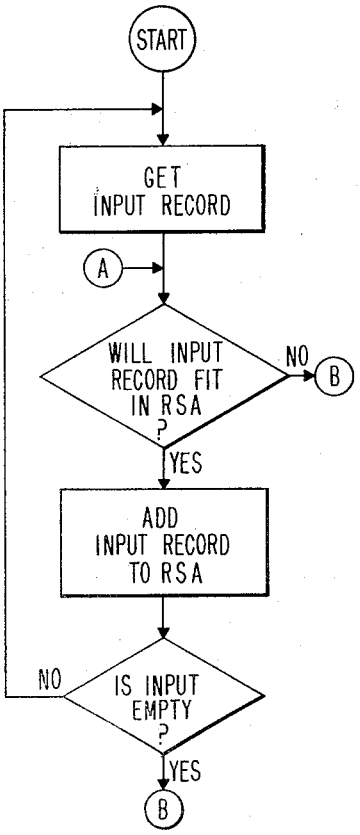
Figure 2B:
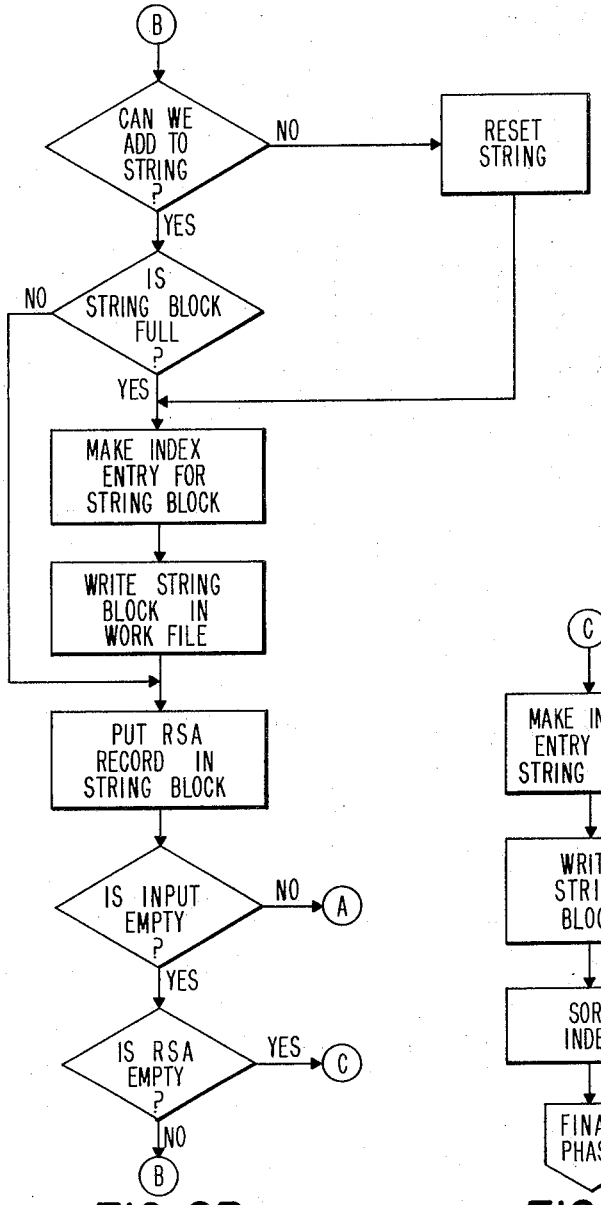
Figure 2C:
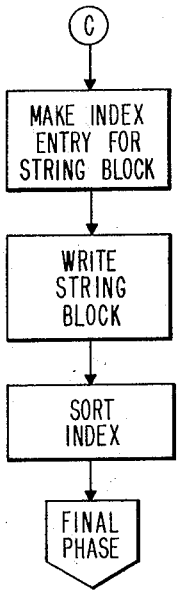
Figure 3A:
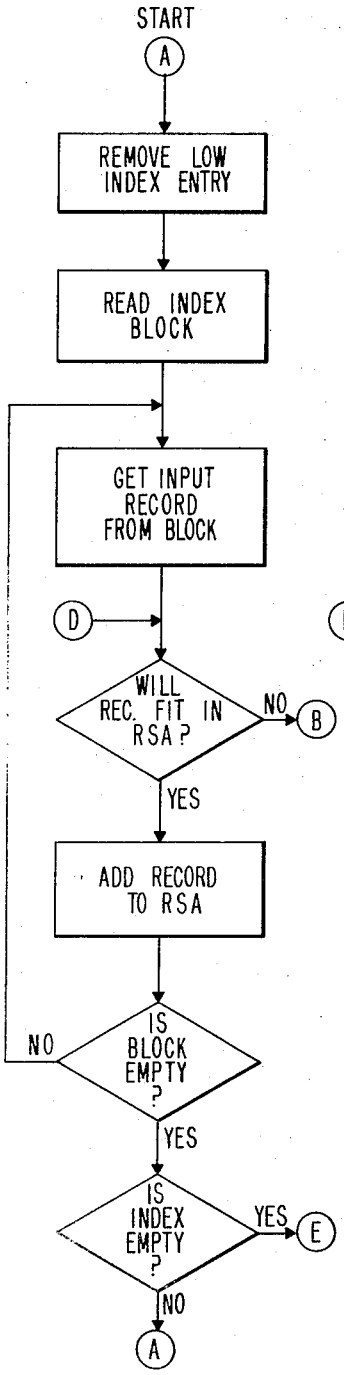
Figure 3B:
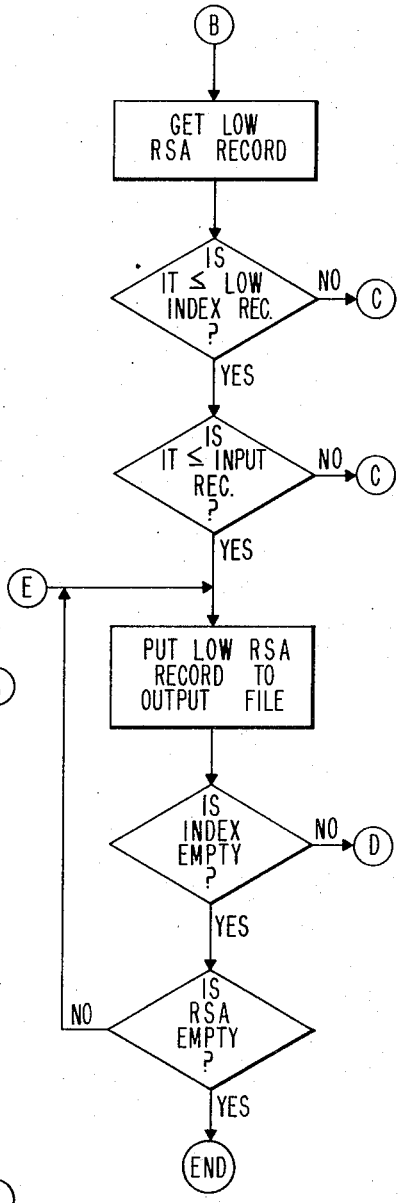
Figure 3C:
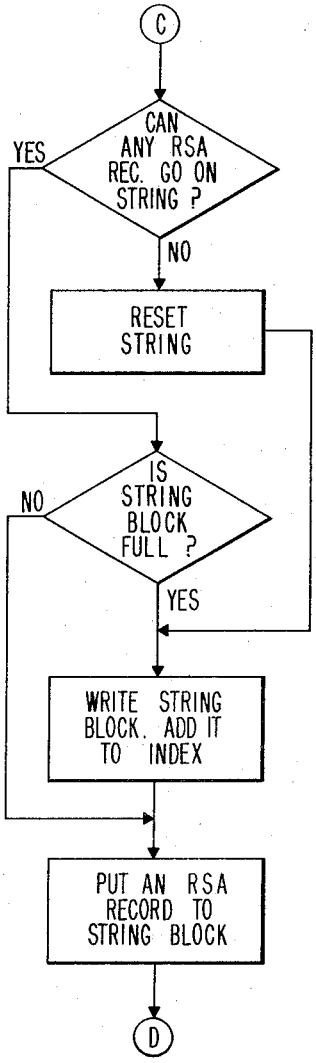

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 5, 1974

920 O.G. 9

T920,010

SORTING METHOD

Watson M. Conner II, Los Gatos, Calif., assignor to International Business Machines Corporation, Armonk, N.Y.

Continuation of application Ser. No. 210,893, Dec. 22, 1971. This application May 14, 1973, Ser. No. 359,938

**Int. Cl. G06f *9/16***

U.S. Cl. 444—1

2 Sheets Drawing. 22 Pages Specification

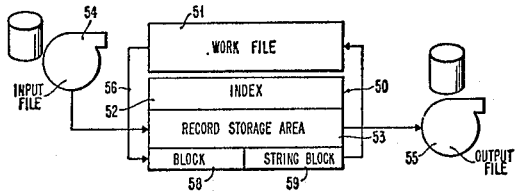

A sorting method utilizing a direct access storage device. An initial sort phase combines a replacement-selection sort with building an index containing the location and a key of a record in each string block written from the replacement-selection sort. A final sort phase combines a replacement-selection sort with removal of records to the output file. Other sort strategies can be used in the initial and final phases.

SORTING METHOD

Original Filed Dec. 22, 1971 2 Sheets-Sheet 1